United States Patent [19]
Genise

[11] Patent Number: 4,788,875
[45] Date of Patent: Dec. 6, 1988

[54] AUXILIARY TRANSMISSION SECTION SHIFT CONTROL SYSTEM

[75] Inventor: Thomas A. Genise, Dearborn Hts., Mich.

[73] Assignee: Eaton Corporation, Cleveland, Ohio

[21] Appl. No.: 92,819

[22] Filed: Sep. 3, 1987

[51] Int. Cl.⁴ .......................... F16H 3/08; B60K 20/14
[52] U.S. Cl. ...................................... 74/334; 74/335; 74/745; 74/868
[58] Field of Search ................. 74/334, 745, 335, 868, 74/331, 339, 752 A, 752 C, 867, 869

[56] References Cited

U.S. PATENT DOCUMENTS

| | | | |
|---|---|---|---|
| 2,121,157 | 6/1938 | Lempereur et al. | 74/334 |
| 2,556,834 | 6/1951 | Ashton et al. | 74/334 |
| 2,637,222 | 5/1953 | Backus | 74/745 |
| 2,654,268 | 10/1953 | Perkins | 74/745 |
| 2,763,290 | 9/1956 | Perkins et al. | 74/745 |
| 2,932,988 | 4/1960 | Flynn et al. | 74/745 |
| 3,011,357 | 12/1961 | Binder | 74/334 |
| 3,105,695 | 10/1963 | Perkins | 74/745 |
| 3,229,551 | 1/1966 | Stuckey | 74/745 |
| 3,648,546 | 3/1972 | McNamara et al. | 74/745 |
| 3,799,002 | 3/1974 | Richards | 74/745 |
| 3,921,469 | 11/1975 | Richards | 74/339 |
| 3,924,484 | 12/1975 | Richards | 74/339 X |
| 3,945,265 | 3/1976 | Bell et al. | 74/334 X |
| 3,983,979 | 10/1976 | Richards | 74/339 X |
| 4,194,410 | 3/1980 | Richards | 74/339 |
| 4,440,037 | 4/1984 | Foxton et al. | 74/745 X |
| 4,555,959 | 12/1985 | Braun | 74/334 |

Primary Examiner—Allan D. Herrmann
Assistant Examiner—David Novais
Attorney, Agent, or Firm—H. D. Gordon

[57] ABSTRACT

A control system (158) for a multi-speed splitter type change gear auxiliary transmission section (14) of a compound transmission (10) of the type permitting preselection of a selected auxiliary section gear ratio is provided. The control system includes an operator actuated selector valve (160) for selection of a desired auxiliary section gear ratio and for selectively pressurizing or exhausting first (2) and second (3) selectively pressurized and exhausted fluid conduits which are directly fluidly connected to first and second (186 and 184) inlet ports at the remotely located actuator assembly (152). The actuator assembly (152) includes pistons (144 and 150) for assuming at least three selectable positions corresponding to engagement of one of at least three selectable auxiliary transmission section ratios and is enclosed in a valve body housing (170) having enlarged cavities adjacent the inlet ports (182, 184, 186) to define enlarged fluid reservoirs ($R_1$, $R_2$, $R_3$) in fluid communication with the working surfaces (192, 194, 196, 202, 212) of the pistons.

2 Claims, 4 Drawing Sheets

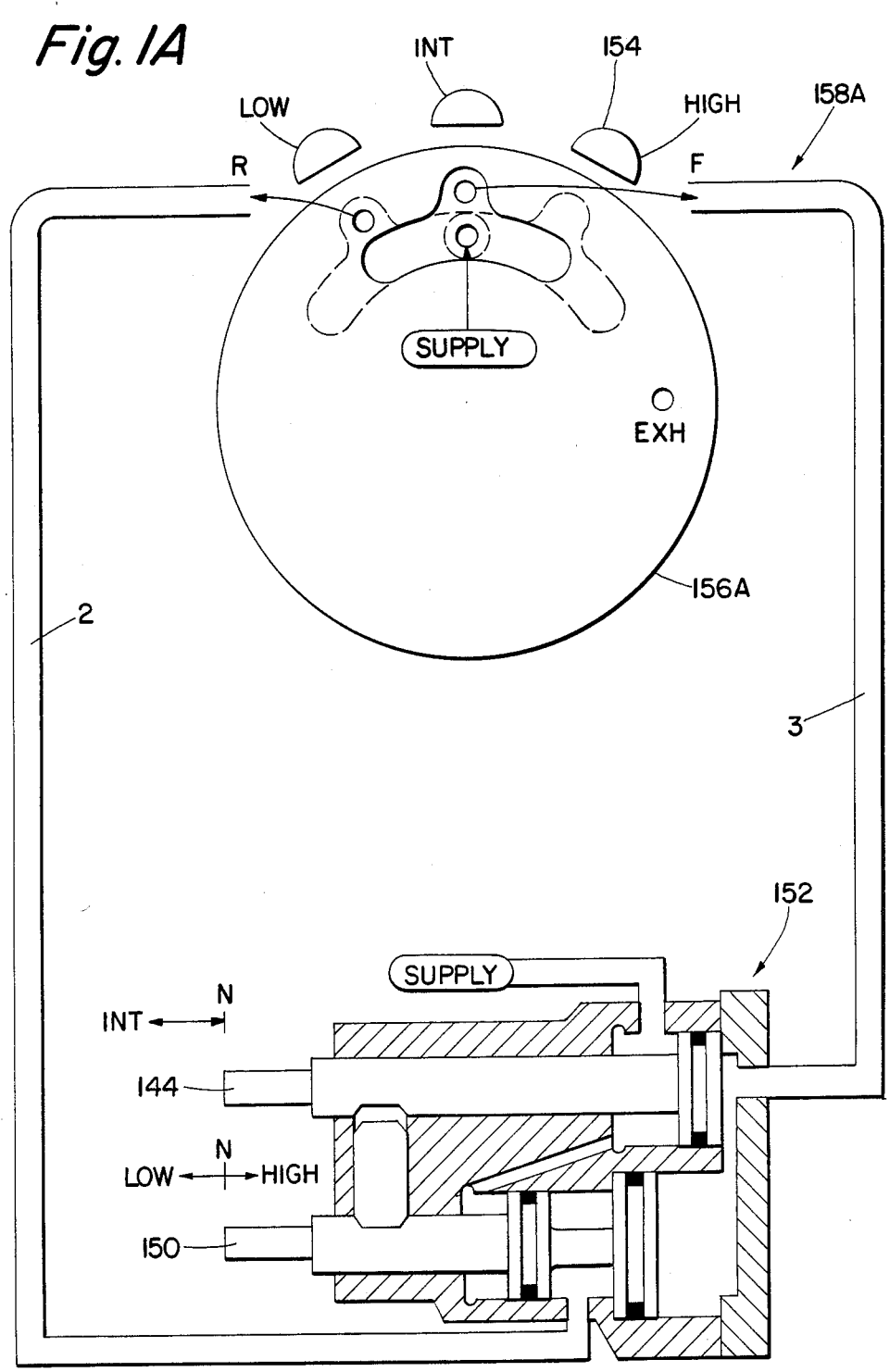

AUXILIARY TRANSMISSION SECTION SHIFT CONTROL SYSTEM

BACKGROUND OF THE INVENTION

1. Field of the Invention

This invention relates to a shift control system for a change gear auxiliary transmission section and, in particular, relates to a shift control system for a splitter type change gear auxiliary transmission section permitting preselection of an auxiliary section shift or gear change which shift or gear change will be executed upon achievement of enabling conditions, such as a torque break permitting disengagement of the previously engaged auxiliary section gear and achieving synchronization or substantial synchronization of the clutch members associated with the preselected gear.

2. Description of the Prior Art

Compound transmissions of the splitter or range type, or a combination thereof, are well known in the prior art as may be see by reference to U.S. Pat. Nos. 3,105,395; 3,648,546; 3,799,002; 2,932,988 and 3,229,551, the disclosures of all of which are hereby incorporated by reference. The main section of such transmissions are typically controlled by the operator by means of a shift lever operating directly upon shift rails or by electric and/or pneumatic means, and the auxiliary section is typically shifted by means of a control lever or button located on or adjacent the shift lever knob for operating the remote auxiliary shift mechanism, either pneumatically, hydraulically and/or electrically. Examples of such shift control systems for compound transmissions are well known in the prior art and examples thereof may be appreciated in greater detail by reference to U.S. Pat. Nos. 2,637,222; 2,763,290; 3,648,546; 3,799,002; 3,921,469; 3,983,799 and 4,194,410, the disclosures of all of which are hereby incorporated be reference.

Blocked change gear transmissions of both the simple and the compound types are also well known in the prior art as may be seen by reference to the above-mentioned U.S. Pat. Nos. 3,799,002; 3,921,469; 3,983,799 and 4,194,410. Blocked transmissions of this type typically utilize jaw clutch assemblies which may be axially shifted against a resilient bias for positive clutch engagement upon sensing of a synchronous or substantially synchronous rotation therebetween. The structure and function of the resilient biased jaw clutch assemblies and of the blockers carried thereby are well known in the prior art and form no part of the present invention. The prior art for change gear transmissions, especially the auxiliary sections of change gear transmissions, are highly advantageous as they permit the operator to preselect a gear change which gear change will be executed upon subsequent achievement of certain operating conditions, such as a break in the torque allowing disengagement of the previously engaged gear and achievement of substantially synchronous rotation of the jaw clutch members associated with the preselected gear.

A pressurized fluid shift control system for preselect type shifting of an auxiliary transmission section is illustrated in U.S. Pat. No. 4,555,959, the disclosure of which is hereby incorporated by reference. This control system utilizes Pilot valves to provide rapid response and preselection prohibit valves which will block fluid communication between the pilot valves and the shifting mechanism until such time as a predetermined condition occurs such as the occurrence of a signal indicative of the operator stroking the vehicle master clutch.

While the auxiliary transmission section shift control systems of the prior art did provide acceptable performance, for certain situations, such as for controlling the preselectable shifting of splitter type auxiliary transmission sections, the prior art systems were of a more complicated and/or expensive structure than desired.

SUMMARY OF THE INVENTION

In accordance with the present invention, the drawbacks of the prior art have been overcome or minimized by the provision of a fluid operated shift control system of the preselect type for splitter type auxiliary transmission section which is relatively inexpensive and uncomplicated.

The above is accomplished by providing a master shift selector means, such as a button or lever located on a shift lever of a transmission, by which an auxiliary section shift may be preselected, and which master shift selector means is directly fluidly connected (i.e. connected by fluid conduits not controlled by valves) with a remote slave shifting mechanism thereby eliminating the expense and complication of pilot valve mechanisms and/or prohibit mechanisms interposed the master and the slave mechanisms. Preferably, the shift control system will be a pneumatically or hydraulically operated auxiliary section control system with relatively large fluid lines directly connecting the master and remote slave mechanisms.

It has been found, that for the preselect shifting of a splitter type auxiliary transmission section, the rapid response required for shifting other types of auxiliary transmission sections is not required and thus the use of pilot valves mechanisms may be eliminated and acceptably rapid response of the slave mechanism can be provided by using somewhat enlarged fluid conduits and/or fluid reservoirs at the remote slave shifting mechanism.

Accordingly, it is an object of the present invention to provide a new and improved relatively simple and inexpensive shift control system for the preselect shifting of a splitter type auxiliary transmission section.

This and other objects and advantages of the present invention will become apparent from a reading of the detailed description of the preferred embodiment taken in view of the accompany drawings.

DESCRIPTION OF THE DRAWINGS

FIG. 1A is a schematic illustration of an alternate embodiment of the shift control system of the present invention.

DESCRIPTION OF THE PREFERRED EMBODIMENT

Figure 1:
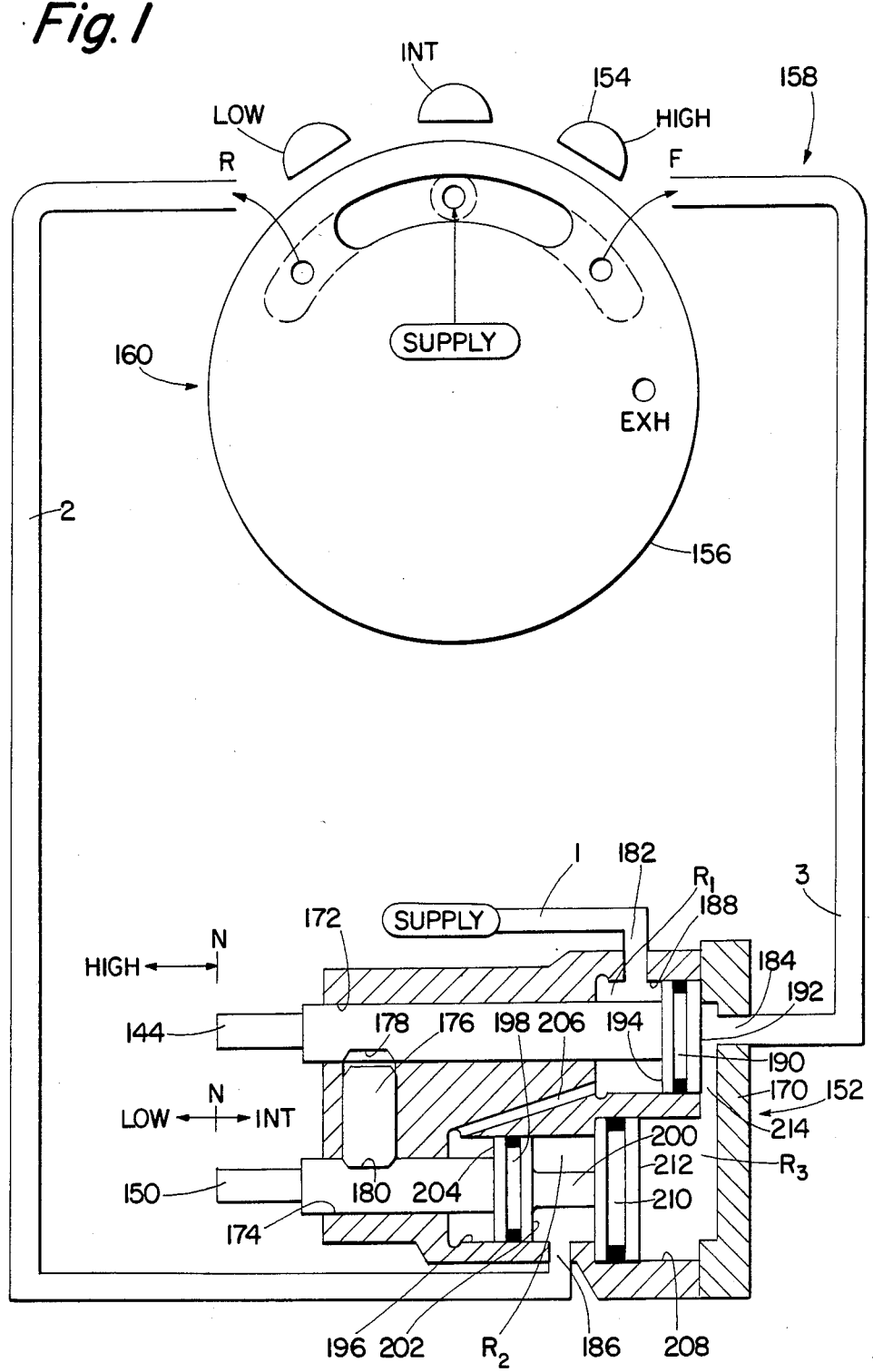
FIG. 1 is a schematic illustration of the shift control system of the present invention.

Certain terminology will be used in the following description for convenience in reference only and will not be limiting. The words "upwardly," "downwardly," "rightwardly" and "leftwardly," will designate directions in the drawings to which reference is made. The words "forward" and "rearward" will refer respectively to the front and rear ends of the transmission as same is conventionally mounted in the vehicle. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps or subdivisions of the gear ratio selected in the main transmission portion. In a splitter type compound transmission, the main transmission section is typically provided with relatively wide steps which are split or subdivided by the auxiliary section.

The term "blocked transmission" or "blocked transmission section" shall designate a change gear transmission or transmission section wherein a selected gear is non-rotatably coupled to a shaft by means of a selectively engagable positive clutch and a blocker is utilized to prevent such engagement until the members of the positive clutch a re at substantially synchronous, such synchronous condition achieved by manual and/or automatic manipulation of the transmission input and/or output shafts to cause a crossing of synchronous condition therebetween but not achieved by frictional contact of the selected clutch members sufficient to cause one of the clutch members, and the apparatus associated therewith, to rotate with the other clutch member. Both the construction and operation of the blockers and blocked transmissions utilizing same has been set forth and claimed in above-mentioned U.S. Pat. Nos. 3,799,002; 3,921,469; 3,983,979 and 4,194,410 and reference is therefore made thereto for such details.

Figure 2:
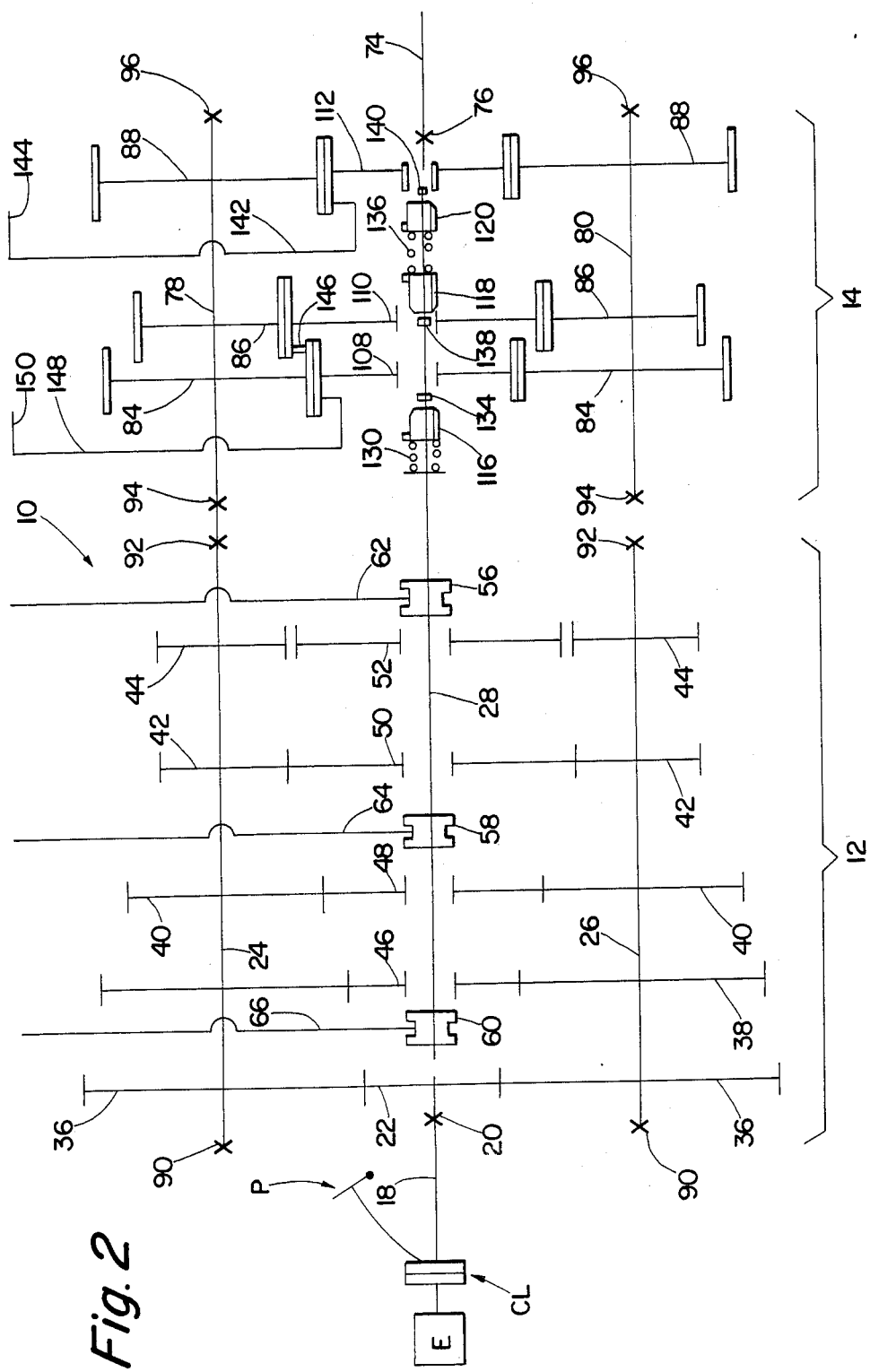
FIG. 2 is a schematic illustration of a compound splitter type transmission of the type advantageously controlled by the shift control system of FIG. 1.
Figure 3:
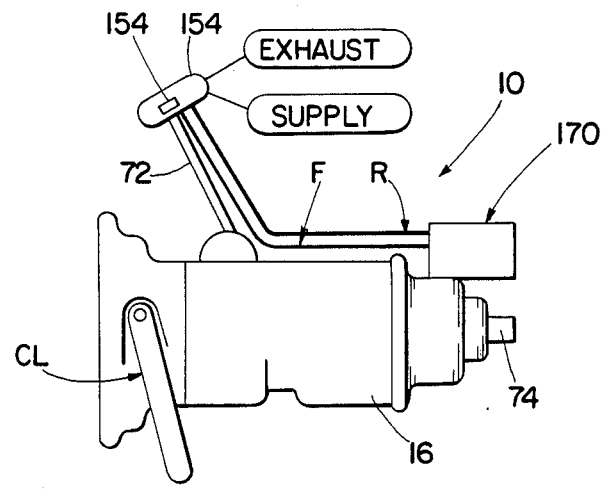
FIG. 3 is a plan view of the transmission illustrated in FIG. 2.

Referring now to FIGS. 2 and 3, there is illustrated a "4×3", twelve forward speed, semi-blocked, splitter type, compound transmission 10. Transmission 10 comprises a main section 12 connected in series with an auxiliary section 14, each of which have a plurality of selectable speeds, or power paths. The main and auxiliary sections are both suitably enclosed by a conventional housing means 16. Transmissions of the type are illustrated in Canadian Pat. No. 1,180,919 and European Pat. No. 0 071 353, the disclosures of which are incorporated by reference.

The transmission 10 includes an input shaft 18 supported adjacent its forward end by bearing 20 and is provided with an input gear 22 non-rotatably connected thereto, as by splines. The input gear 22 simultaneously drives a pair of main section countershafts at equal rotational speed. In the illustrated embodiment, the transmission is provided with two main section countershafts, 24 and 26, disposed on diametrically opposite sides of the mainshaft 28, which mainshaft is coaxially aligned with input shaft 18 and is provided with a pilot portion at its forward end rotatably received with and supported by the rearward end of input shaft 18.

The input shaft 18 is normally driven in one direction only by a prime mover, such as a throttle controlled Diesel engine E through a selectively operated, normally engaged, friction master clutch CL. Clutch CL may be selectively disengaged by use of a pedal P as is known in the art.

Compound transmissions, especially of the splitter type, are usually designated by an "A×B" notation wherein;

"A" equals the number of selectable forward speeds or power paths in the main transmission section;

"B" equals the number of selectable speeds or power paths in the auxiliary transmission section; and "A×B" equals the number of available forward transmissions speeds.

Each of the main section countershafts 24 and 26 is provided with an identical grouping of countershaft gears, 36, 38, 40, 42 and 44 thereon, which groupings form a pair of gears, such as a pair of gears 36, of identical size and number of teeth and disposed on diametrically opposite sides of the mainshaft 28. A plurality of main section mainshaft gears 46, 48, 50 and 52 surround the mainshaft 28 and are slidably clutchable thereto, one at a time, by sliding clutch collars as is well known in the art.

The main section mainshaft gears 46, 48 and 50 encircle the mainshaft 28, are in continuous meshing engagement with, and are floatingly supported by, the diametrically opposite pairs of countershaft gears, 38, 40 and 42, respectively, which mounting means and the special advantages resulting therefrom are explained in greater detail in U.S. Pat. Nos. 3,105,395 and 3,335,616, both assigned to the assignee of this application and both incorporated by reference. The mainshaft gear 52 is the reverse gear and is in continuous meshing engagement with a pair of countershaft gears 44 by means of conventional intermediate idler gears (not shown). The forward most countershaft gears 36 are continuously meshed with and driven by the input gear 22 for causing simultaneous rotation of the countershaft 24 and 26 whenever the input shaft is rotatably driven.

The main section mainshaft gears 46, 48, 50 and 52, and main section countershaft gears 36, 38, 40, 42 and 44, and the idler gears, are all continuously meshed with and driven by the input gear 22 and thus, in combination, form the input gearing of the transmission 10.

Sliding clutch collars 56, 58 and 60 are splined to mainshaft 28 for axial movement relative thereto and rotation therewith as is well known in the art. Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars, or shift rails (not shown) of a known shift bar housing assembly which is operated by a conventional shift lever 72. It is understood that shift lever 72 may directly act upon the shift rails, may act upon the shift rails by means of a remote control linkage or may actuate valve means. The present invention is also applicable to transmissions utilizing a remote mechanical, electrical or fluid shift mechanism in place of a shift bar housing and conventional shift lever.

Considering now the splitter auxiliary section 14, the mainshaft 28 extends thereinto and is coaxially arranged with and piloted into an output shaft 74 which is in turn supported within the housing 16 by suitable bearings indicated at 76. The auxiliary section further includes a plurality of auxiliary section countershafts 78 and 80 each having an identical grouping of countershaft gears 84, 86 and 88 thereon. As is known in the art and illustrated in the above-mentioned U.S. Pat. No. 3,105,395, to minimize the axial and transverse dimension of a twin countershaft type transmission, a main section countershafts 24 and 26 are displaced by about 40 to 90 degrees from the auxiliary section countershafts. Main section countershafts are supported in the housing 16 by bearings 90 and 92 while auxiliary section countershafts, 78 and 80, are supported in housing 16 by bearings 94 and 96.

Two auxiliary section mainshaft gears, 108 and 110 encircle the mainshaft 28 and are constantly meshed with and floatingly supported by the auxiliary countershaft gear pairs 84 and 86, respectively. Output gear 112 is splined to output shaft 74 for axial movement relative thereto in rotational movement therewith. Output gear 112 is constantly meshed with auxiliary countershaft gear pair 88.

Resiliently biased clutch members 116, 118 and 120 are splined to mainshaft 28 and, in combination with blockers (not shown) provide resilient, blocked clutching apparatus the type described in above mentioned U.S. Pat. Nos. 3,799,002; 3,921,469 and 3,924,484 for selectively clutching gears 108, 110 and 112, respectively, one at a time, to mainshaft 28. Clutch 116 is resiliently biased axially by spring 130 and limited in its axial movement by positive stop 134. Clutch members 118 and 120 are biased axially apart by spring 136 surrounding the mainshaft and limited in axial movement by stops 138 and 140.

Gear 112 is axially moved by shift fork 142 which is axially movable by a shift piston 144. Auxiliary mainshaft gears 108 an 110 are joined for joint axial movement and independent rotation by ring 146 and are axially movable by shift fork 148 axially moved by shift piston 150. Shift pistons 144 and 150 are contained in a remote auxiliary section shift valve assembly 152 to be described in greater detail below, by which gears 108, 110 or 112 are selectively engaged, one at a time, to mainshaft 28. Engagement of gear 108 to mainshaft 28 defines the low speed or greatest gear reduction power path of auxiliary section 14. Engagement of gear 110 to mainshaft 28 defines the intermediate speed for intermediate gear reduction power path of auxiliary section 14. Of course, engagement of gear 112 to mainshaft 28 is effective to couple mainshaft 28 directly to the output shaft 74 and defines the high speed or direct drive power path of auxiliary section 14.

Control of auxiliary section shift valve assembly 152 is by an operator controlled selector means, such as selector lever 154 attached to gear shift lever 72 at the gear shift knob 156. Typically, master control selector switch 154 will be a button, or toggle lever, having three unique positions ("Low", "Int", and "High") by which any one of the auxiliary section power paths or speeds may be preselected.

Preferably, as described in above-mentioned Canadian Pat. No. 1 180 919, the blockers utilized in auxiliary section transmission 10, and the other clutch elements of a given clutchable pair of clutch members, are provided with complementary angled ramps on the blocker teeth or members thereof and tend to, under the influence of the spring bias, cause an unblocking when the mainshaft is otherwise unconnected to any of the mainshaft gears and hence is at a minimum inertia. The angling of the blocker teeth is, however, insufficient to effect unblocking during a normal shift and hence will not interfere with the required blocking function thereof during a normal shift. It has been found that complementary ramp angles of about 15 degrees to 25 degrees, preferably about 20 degrees, provides satisfactory operation when used in connection with normally encountered spring forces and clutch inertias.

By use of shift control lever 154 a shift or gear change in the auxiliary section 14 of transmission 10 may be preselected by the operator by simply moving the lever 154 to the desired selection position. The selected auxiliary section gear change or shift will then be fully executed at such time as enabling conditions, such as a break in torque transmitted by the transmission permitting the currently engaged gear to be disengaged and/or a substantial synchronization of the selected gear positive clutch members, occurs.

It is understood that although the shift control system of the present invention is particularly advantageous in association with transmissions of the compound splitter type utilizing blocked clutch assemblies in at least the auxiliary section thereof, the shift control system of the present invention is also applicable to any other change gear transmission structure allowing preselection of a gear change or shift thereof.

Figure 4:
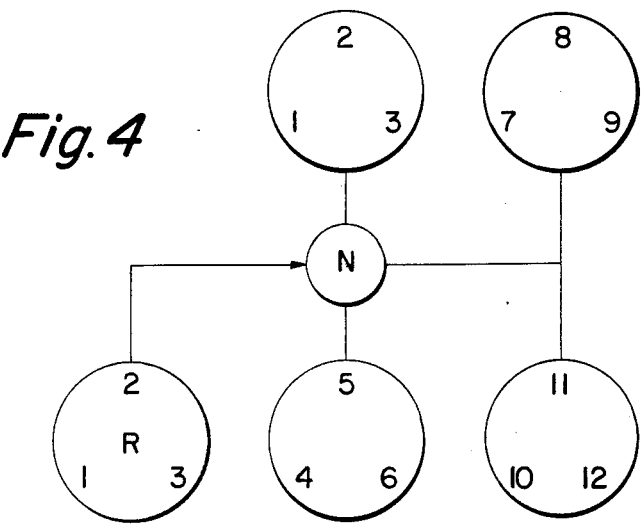
FIG. 4 is a schematic illustration of the shift pattern of the transmission of FIGS. 2 and 3.

The shift pattern for the "4×3", twelve forward speed, compound splitter type transmission 10 of the present invention may be seen by reference to FIG. 4.

The shift control system 158 for shifting the auxiliary section 14 of compound transmission 10 comprises the master selector valve assembly 160 which is preferably encased within shift lever knob 156 and remote shift actuator assembly 152 provided in an integral auxiliary section valve assembly block 170 as seen in FIG. 3.

Shift selector valve 160 is an operator actuated selection mechanism having a button or toggle switch member 154 movable to one of three selectable positions, herein illustrated as "Low", "Int" and "High", corresponding respectively to selectable low, intermediate and high speed power paths of the auxiliary transmission section 14. Valve 160 is connected to the supply of pressurized fluid, preferably pressurized air, preferably a filtered, regulated connection to a truck air supply system. In the "Low" position of selector member 154, valve 160 will connect the supply of air to a pressure line 2 and connect pressure line 3 to exhaust. In the "Int" position of selector member 154 valve 160 will connect lines 2 and 3 to exhaust and block the supply line. In the "High" position of selector member 154, valve 160 will connect line 3 to the supply of pressurized fluid and will connect line 2 to exhaust. The specific structure of valve 160, and alternate valve structures suitable of performing substantially the same function, are well known in the prior art and such structures form no part of the present invention.

Shift actuator assembly 152 comprises a valve body or block 170 defining two substantially parallel bores 172 and 174 in which are slidably received shift actuator pistons 144 and 150, respectively. An interlock mechanism or link 176 cooperates with notches 178 and 180 in the shift pistons to assure that not more than one of the pistons 144 and 150 may be moved from the neutral positions thereof at a time. Interlock member 176 will thus assure that only one of the auxiliary section mainshaft gears 108, 110 or 112 may be engaged at a time.

Interlock structures of this type are well known in the prior art.

Valve body 170 is provided with ports 182, 184 and 186 for connection to pressure lines 1 (connected to the source), 3 and 2, respectively. Port 182 communicates with an enlarged diameter or cylinder portion 188 of bore 172 in which a piston portion 190 of shift piston 144 is slidably and sealingly received. Piston portion 190 presents a relatively larger area surface 192 on the righthand end thereof and a relatively smaller area surface 194 on the lefthand surface thereof. The lefthand surface 194 of piston portion 190 is exposed to the constant supply pressure in line 1 to bias piston 144 rightwardly to the neutral position as shown. The righthand surface 192 of piston portion 190 is exposed to pressure in line 3. As the surface area 192 exposed to pressure in line 3 is greater that the surface area 194 exposed to pressure in line 1, when both lines 1 and 3 are pressurized, piston 144 will be urged to the left to the "High" position as shown.

Bore 174 is provided with a first enlarged diameter section 196 in which piston portion 198 of shift piston 150 is slidably and sealingly received. A reduced diameter stem portion 200 having a smaller diameter than portion 202 of piston member 150 extends rightwardly from piston portion 198. Accordingly, piston portion 198 presents a relatively larger surface area 202 on the righthand surface thereof and a relatively smaller surface area surface 204 on the lefthand face thereof. The relatively larger surface area 202 of piston portion 198 is exposed to constant fluid pressure in line 2 while the relatively smaller surface area surface 204 of piston portion 198 is exposed to fluid pressure in line 1 via passage 206. Accordingly, when both lines 1 and 2 are pressurized, piston 150 will be moved leftwardly to the "Low" position.

Bore 174 presents a further enlarged diameter portion or cylinder 208 in which a disc like piston member 210 is slidably and sealingly received. Piston 210 and piston 150 are independently axially movable. Piston member 210 in its leftward most position as determined by the shoulder between cylinders 196 and 208 will abut projection 200 of piston 150 to urge same to the neutral position as shown. As may be seen, the surface area 212 of piston 210 facing rightwardly is considerably greater than surface area 204 and thus surface area 212, which is exposed to pressure in line 3 via passage 214, will urge piston 150 leftwardly to the neutral position only when both lines 3 and 1 are pressurized as the leftward movement of piston member 210 is limited by the shoulder between cylinder portion 196 and 208.

In operation, as may be seen by reference to FIGS. 1 and 2, pressure line 1 is constantly pressurized from the source of pressurized fluid and pressure lines 2 and 3 are selectively pressurized, one at a time, to achieve high or low speed operation of auxiliary transmission section 14. To achieve low speed operation of transmission 14, line 2 is pressurized urging piston 150 and shift fork 148 carried thereby leftwardly. To achieve intermediate speed operation of auxiliary section 14, pressure lines 2 and 3 are exhausted to urge piston 150 and shift fork 148 carried thereby rightwardly. To achieve high speed operation of auxiliary section 14, pressure line 3 is pressurized and pressure line 2 is exhausted to center piston 150 and shift fork 148 carried thereby in the neutral position as shown in FIG. 1 and to urge piston 144 and shift fork 142 carried thereby leftwardly.

At inlet ports 182, 184 and 186, the valve block 170 defines relatively large spaces or cavities, $R_1$, $R_3$ and $R_2$ in constant fluid communication with pressure lines 1, 3 and 2, respectively, which cavities will act as reservoirs at the actuator assembly 152 for pressurized fluid in lines 1, 3 and 2, respectively.

Pressurization of line 2 to achieve "Low" speed operation of auxiliary transmission section 14 occurs when selector button 154 is moved to the "Low" position to connect line 2 to the supply. Once pressurized, line 2 will remain pressurized for so long as button 154 remains in the low position. Pressure line 2 directly connects the selector valve 160 to the shift actuator 152 to pressurize the $R_2$ reservoir which, in the event of a break in torque allowing movement of the shift forks 148 and 142, will cause piston portion 198 to urge shift piston 150 leftwardly to the low position.

To place the auxiliary transmission section 14 in the intermediate speed condition from either the "High" or "Low" speed condition thereof, it is necessary to exhaust line 2 or line 3. This is achieved by moving selector button 154 to the intermediate position which will exhaust both line 2 and line 3 and block the supply line at selector valve 160. Once line 2 and line 3 are exhausted, they will remain in the exhausted condition until the selector button 154 is moved to either the "Low" or "High" positions thereof.

To select "High" speed operation of auxiliary transmission section 14, the selector button 154 is moved to the "High" position thereof exhausting line 2 and pressurizing line 3 and thus reservoir $R_3$. As torque conditions permit movement of the shift forks in the auxiliary transmission section, pressure in the reservoir $R_3$ will act on piston face 192 to move shift piston 144 leftwardly to the "High" position thereof. Once pressurized, line 3 will remain pressurized until such time as the selector button 154 is moved to the "Low" or "Intermediate" positions thereof.

As transmission 10 is a preselect splitter type compound transmission, it is not necessary that the auxiliary transmission section be instantaneously responsive to movements of the selector button 154 as a splitter auxiliary section shift is normally accomplished by preselecting a shift then at a later time relieving or breaking torque in the drive line by releasing the throttle pedal and/or disengaging the master clutch at which time the auxiliary section clutch members will begin movement. By utilizing relatively larger diameter pressure lines 1, 2 and 3, and by utilizing reservoirs $R_1$, $R_2$ and $R_3$ in the shift block of the shift actuator mechanism 152, sufficiently rapid response of the auxiliary transmission shifting mechanism is obtained while eliminating the complication and expense associated with providing pilot valve mechanisms as utilized in the prior art.

In FIG. 1A, an alternate embodiment 158A of the shift control system of the present invention is illustrated for use with transmissions of the overdrive type wherein shift piston 144 is utilized to engage the "Intermediate" position and rightward movement of shift piston 150 will provide the "High" speed position of the auxiliary transmission section Accordingly, in the "Intermediate" position, control valve 160A will connect the supply to the pressure line 3 while in the high speed position both the pressure lines 2 and 3 are vented to exhaust. With these exceptions, control system 158A is substantially functionally and structurally identical to control system 158 described above.

In view of the above, it may be seen that a relatively simple and inexpensive shift control system for a remotely controlled preselectable splitter type change gear transmission sections has been provided Although this invention has been described in its preferred form with a certain degree of particularity, it is understood that the present disclosure of the preferred form is for descriptive purposes only and that various modifications and changes in the detail construction and arrangement of the parts may be resorted to without departing from the spirit and the scope of the invention as hereinafter claimed.

I claim:

1. A control system for a splitter type change gear auxiliary transmission section of a compound vehicular transmission comprising a main transmission section connected in series with said auxiliary transmission section and drivingly connected to a fuel controlled engine by a selectively engaged and disengaged master friction clutch, said auxiliary section having at least three engagable auxiliary speeds, said control system of the type permitting preselection of a auxiliary section gear change to be executed upon achievement of enabling transmission operating conditions, said control system comprising;

an operator actuated gear selector valve having a selector switch movable to at least three positions to preselect a desire engaged auxiliary transmission section gear, said selector valve connected to a source of pressurized fluid, a first selectively pressurized and exhausted fluid conduit, a second selectively pressurized and exhausted fluid conduit and an exhaust conduit, in said first position of said selector switch said selector valve establishing communication between said source and said first selectively pressurized and exhausted conduit and exhausting said second selectively pressurized and exhausted conduit, in said second position of said selector switch said selector valve exhausting both of said first and second selectively pressurized and exhausted conduits and blocking said source, and in said third position of said selector switch said selector valve connecting said second selectively pressured and exhausted conduit to said source of pressurized fluid and exhausting said first selectively pressurized and exhausted conduit;

an actuator valve assembly remote from said gear selector valve and having a supply port in constant fluid communication with said source of pressurized fluid, a first pressure line port and a second pressure line port, said actuator valve assembly including piston means having a first position of engagement of a first selected gear, a second position for engagement of a second selected gear and a third position for engagement of a third selected gear, said piston means assuming said first position from one of said other positions only upon the occurrence of said enabling conditions and pressurization of said first pressure line port and exhaust of said second pressure line port, said piston means assuming said second position from one of said other positions only upon the occurrence of said enabling conditions and exhaust of both said first and second pressure line ports and said piston means assuming said third position form one of said other positions only upon the occurrence of said enabling conditions and pressurization of said second pressure line port and exhaust of said first pressure line port; said control system characterized in that:

said first selectively pressurized and exhausted conduit connecting said selector valve directly to said first pressure line port and said second selectively pressurized and exhausted conduit connecting said selector valve directly to said second pressure line port;

said actuator valve assembly comprises a valve body defining a first enlarged cavity adjacent said supply port, a second enlarged cavity adjacent said first pressure line port and a third enlarged cavity adjacent said second line port, said fluid cavities in fluid communication with working surfaces of said piston means;

the force of said pressurized fluid acting on the working surfaces of said piston means being insufficient to cause said piston means to assume a different position when said engine is fueled substantially above idle speed and said master clutch is engaged; and said enabling conditions occur upon either disengagement of said master clutch and/or a significant reduction of fuel supply to said engine.

2. The control system of claim 1 wherein a shift lever includes a shift knob and said operator actuated selector valve is located in the shift knob.

* * * * *